(12) United States Patent
Bosler (10) Patent No.: US 7,611,660 B2
(45) Date of Patent: Nov. 3, 2009

(54) APPARATUS AND METHOD FOR COOLING MATERIAL DURING CONTINUOUS VACUUM FORMING

(75) Inventor: Kenneth D. Bosler, Holland, PA (US)

(73) Assignee: Bosler Design Services, Inc., Warminster, PA (US)

( * ) Notice: Subject to any disclaimer, the term of this patent is extended or adjusted under 35 U.S.C. 154(b) by 316 days.

(21) Appl. No.: 11/489,061

(22) Filed: Jul. 18, 2006

(65) Prior Publication Data

US 2008/0018014 A1 Jan. 24, 2008

(51) Int. Cl.
*B29C 47/88* (2006.01)
*B29C 43/56* (2006.01)

(52) U.S. Cl. .............. 264/555; 264/210.1; 264/553; 264/348; 264/571; 264/177.17; 264/211.13; 264/284; 264/101; 264/237; 264/557; 264/176.1; 264/211.12; 425/326.1; 425/388; 425/384; 425/405.1; 425/371; 474/93

(58) Field of Classification Search ............... 264/544, 264/553, 557, 571, 177.17, 211.13, 284, 264/348, 101, 237, 176.1, 210.1, 211.12; 474/93; 425/326.1, 388, 384, 405.1, 371

See application file for complete search history.

(56) References Cited

U.S. PATENT DOCUMENTS

| | | | | |
|---|---|---|---|---|
| 3,065,500 A | * | 11/1962 | Berner | 425/4 R |
| 3,889,801 A | * | 6/1975 | Boyer | 198/689.1 |
| 3,986,918 A | * | 10/1976 | Berner | 156/497 |
| 4,290,248 A | * | 9/1981 | Kemerer et al. | 52/309.16 |
| 5,314,325 A | * | 5/1994 | Bosler | 425/384 |
| 5,906,840 A | * | 5/1999 | Bosler et al. | 425/388 |
| 5,909,764 A | * | 6/1999 | Sartschev et al. | 164/481 |
| 6,010,323 A | | 1/2000 | Sekino | 425/122 |
| 6,054,089 A | * | 4/2000 | Lupke et al. | 264/348 |
| 6,161,354 A | | 12/2000 | Gilbert et al. | 52/520 |
| 6,391,456 B1 | | 5/2002 | Krishnaswamy et al. | 264/519 |
| 6,737,008 B2 | | 5/2004 | Gilbert et al. | 264/553 |
| 6,907,702 B2 | | 6/2005 | Gilbert et al. | 52/555 |

* cited by examiner

*Primary Examiner*—Richard Crispino
*Assistant Examiner*—Martin Rogers
(74) *Attorney, Agent, or Firm*—Porzio, Bromberg & Newman, P.C.

(57) ABSTRACT

The present invention relates to an apparatus and method for cooling material during continuous vacuum forming. The apparatus includes one or more cooling regions positioned adjacent one or more vacuum regions. A rotatable support belt including perforations therein supports a flexible patterned belt. The flexible patterned belt includes apertures spaced along the length and width thereof. The one or more cooling regions provide a cooling fluid to be drawn through the apertures in the flexible patterned belt to form an area of cooling fluid on the flexible patterned belt which contacts a bottom surface of a hot material received on the flexible patterned belt in order to cool the bottom surface of the material and the flexible patterned belt. The vacuum regions are in fluid flow communication with the perforations of the support belt and the apertures of the flexible patterned belt for drawing the material onto the flexible patterned belt. The vacuum regions remove the cooling fluid from the flexible patterned belt. Cooling can also be provided by a cooling region positioned above the material for simultaneously cooling an upper surface of the material.

18 Claims, 9 Drawing Sheets

APPARATUS AND METHOD FOR COOLING MATERIAL DURING CONTINUOUS VACUUM FORMING

BACKGROUND OF THE INVENTION

1. Field of the Invention

The present invention relates to a system for continuous vacuum forming of a shaped polymeric article and more particularly to vacuum forming a plasticized material on a flexible patterned belt or a pair of rotating belts having apertures therein while providing cooling on both a top surface and a bottom surface of the polymeric material during the shaping process.

2. Description of Related Art

Continuous vacuum forming processes are known for shaping an extruded plastic sheet. U.S. Pat. No. 5,314,325 describes an apparatus for continuous vacuum forming in which hot plasticized material is drawn in contact with a flexibly resilient belt. A cooling station is included for lowering the temperature of the hot plasticized material for final forming while the formed material is still in contact with the flexibly resilient belt. The cooling station includes a water spray means and a water collection means. The water spray means sprays water on a top surface of the formed product for facilitating removal of the final formed product from the belt.

U.S. Pat. No. 6,319,456 describes a method for continuous vacuum forming in which a sheet of hot polymeric material is disposed on a rotating belt having a mold impression. Vacuum pressure is applied to the polymeric material through the belt to draw the polymeric material into contact with the mold impression. The central patterned portion of the sheet is cooled below its heat deflection temperature while leaving at least one lateral edge at a temperature above the heat deflection temperature. The lateral edges are not vacuum formed. The lateral edge is deformed by mechanical deformation while the plastic portion of the lateral edge is still hot. Thereafter, the lateral edge is cooled to a temperature below the heat deflection temperature. A water spray is used for cooling the materials below the heat deflection temperature.

The above described patents have the limitation of only providing cooling on a top surface or a portion of the top surface of a formed article which can result in the formed article not being flat since the bottom surface of the article which does not have cooling can continue to shrink in relation to the top surface of the article which has cooling and does not continue to shrink resulting in a curved panel. It is desirable to provide a controlled cooling system for cooling of both the top and bottom surface of the formed article during continuous vacuum forming.

SUMMARY OF THE INVENTION

The present invention relates to an apparatus and method for cooling material during continuous vacuum forming. The apparatus includes one or more cooling regions positioned adjacent one or more vacuum regions. A rotatable support belt including perforations therein supports a flexible patterned belt. The flexible patterned belt includes apertures spaced along the length and width thereof. The one or more cooling regions provide a cooling fluid to be pushed through and/or vacuum drawn through the apertures in the flexible patterned belt to form an area of cooling fluid on the flexible patterned belt which contacts a bottom surface of a hot material received on the flexible patterned belt in order to cool the bottom surface of the material and the flexible patterned belt. The vacuum regions are in fluid flow communication with the perforations of the support belt and the apertures of the flexible patterned belt for drawing the material onto the flexible patterned belt.

The one or more cooling regions and the one or more vacuum regions can be formed in a cooling plate coupled or integral with a top surface of a vacuum manifold. The cooling regions can comprise an indentation in the cooling plate for receiving the cooling fluid. Upon application of the vacuum regions the cooling fluid flows from the indentation through the perforations of the support belt and the apertures of the flexible patterned belt to be received on the flexible patterned belt. The vacuum regions remove the cooling fluid from the flexible patterned belt and the cooling fluid can be collected in a cooling fluid collector. Cooling can also be provided by a cooling region positioned above the material for simultaneously cooling an upper surface of the material.

The present invention provides improved cooling to a sheet of extruded material simultaneously with cooling of the flexible patterned belt. The cooling of the flexible patterned belt after shaping allows the flexible patterned belt to operate at higher temperatures during the shaping process to provide improved shaping. Additional cooling regions can be used to increase the temperature drop of the flexible patterned belt allowing the apparatus to be operated at higher speeds.

In an alternate embodiment, the present invention relates to an apparatus and method for cooling material during continuous vacuum forming between a pair of rotating belts. One or more cooling regions are provided on each of the rotating belts to provide cooling regions of fluid on each of the rotating flexible patterned belts in order to cool the top and bottom surfaces of the material and the flexible patterned belts. One belt includes a plurality of teeth, which are received in a plurality of indentations of the other belt. Each of the belts includes a mold, which forms a channel when the belts are adjacent to one another. A vacuum is applied to at least one of the flexible patterned belts for drawing material received in the channel and alignment of the belts. Preferably, a vacuum can be applied to both of the belts for improved alignment. Each belt can include a plurality of apertures, which are in fluid flow communication with a plurality of perforations of a respective flat support belt positioned over a vacuum manifold.

The invention will be more fully described by reference to the following drawings.

DETAILED DESCRIPTION

Reference will now be made in greater detail to a preferred embodiment of the invention, an example of which is illustrated in the accompanying drawings. Wherever possible, the same reference numerals will be used throughout the drawings and the description to refer to the same or like parts.

Figure 1:
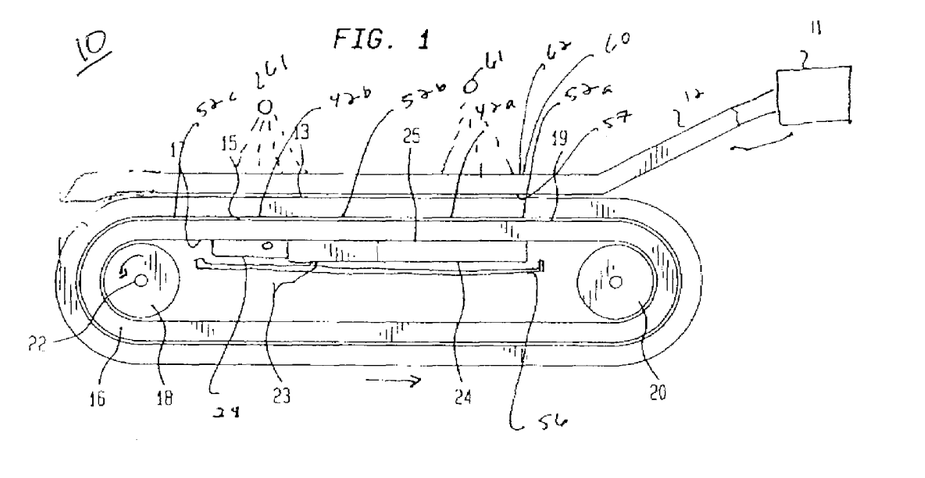
FIG. 1 is a schematic diagram of an apparatus for cooling material during continuous vacuum forming.

FIG. 1 illustrates an apparatus for cooling material during continuous vacuum forming 10 in accordance with the teachings of the present invention. Sheet of material 12 is extruded from extruder 11 onto apparatus 10. Sheet of material 12 can be any hot plasticized material of a suitable polymeric material of thermoplastic and thermosetting compositions, such as polyethylene, polyvinylchloride (PVC), polypropylene, polyethylene terepathalate, thermoplastic olefins, acrylonitrile-styrene-acrylic (ASA), polyurethane, epoxy, polyester, polystyrene, acrylonitrile-butadiene-styrene (ABS), nylon, ethylene-vinyl acetate (EVA), polycarbonate and alloys, vinyl, blends or coextrusions of these resins. A preferred extruded sheet of material 12 is PVC. Suitable thermoplastic materials can include cellulose fibers, reinforcement elements, colorants, foamants, fillers and the like, which are compatible with the thermoplastic material.

Sheet of material 12, while it is still hot from extrusion, is applied to top surface 13 of flexible patterned belt 14. Support belt 16 is positioned underneath flexible patterned belt 14 and upper surface 19 of support belt 16 contacts bottom surface 15 of flexible patterned belt 14. Flexible patterned belt 14 and support belt 16 extend around rollers 18 and 20. Rollers 18 and 20 are driven by driving means 22 to make rolling contact with bottom surface 17 of support belt 16. Vacuum means 23 applies a vacuum through vacuum manifold 24 to area 25 above vacuum manifold 24 between rollers 18 and 20.

Figure 2:
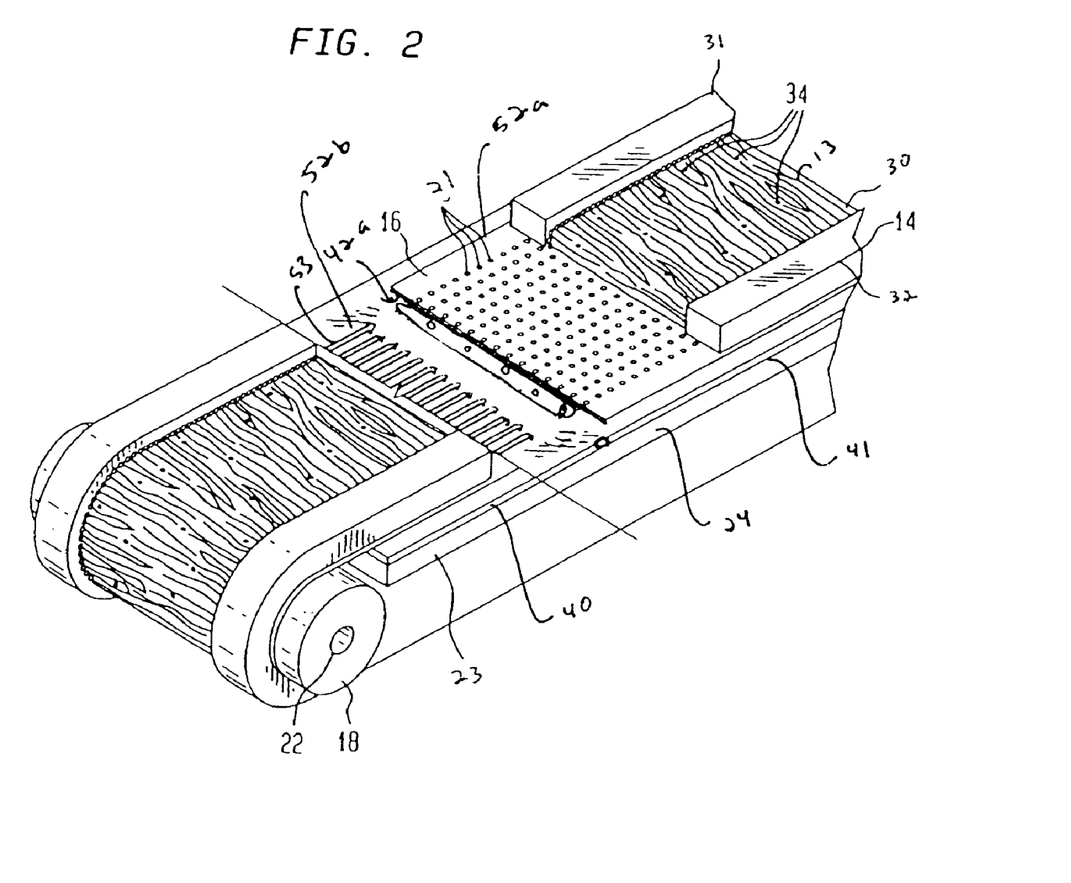
FIG. 2 illustrates a side perspective view of a cooling plate, support belt and flexible patterned belt.

Support belt 16 is preferably formed of a flat perforated metal material. For example, metal materials useful for forming support belt 16 include stainless steel, aluminum and nickel. A plurality of perforations 21 can be formed in support belt 16, as shown in FIG. 2. For example, perforations 21 can have a diameter of about 1/32 of an inch to about 1/16 of an inch and can have a spacing between each perforation of about 1/4 inch to about 1/2 inch.

Preferably, flexible patterned belt 14 is formed of a rubber material or a rubberized material. Most preferably flexible patterned belt 14 is formed of silicon rubber. Pattern 30 is formed between edges sections 31 and 32. For example, pattern 30 can resemble a grained textured surface with raised and depressed surface areas such as is used in vinyl siding applications. A plurality of apertures 34 are formed in flexible patterned belt 14. Apertures 34 are in fluid flow communication with perforations 21 to facilitate drawing of material onto top surface 13 of flexible patterned 14 belt by vacuum means 23 to shape an article as described in U.S. Pat. No. 5,906,840, hereby incorporated by reference into this application.

Figure 3:
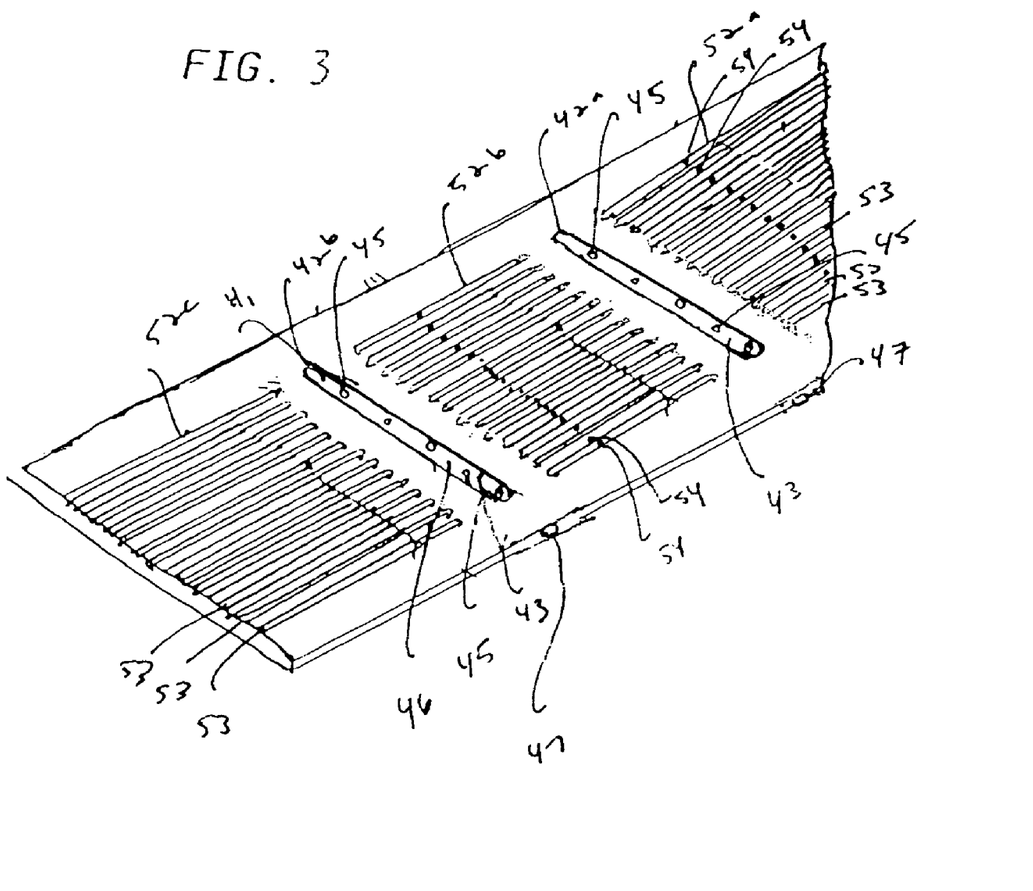
FIG. 3 is a schematic diagram of the cooling plate.

Cooling plate 40 can be formed or attached to a top surface 41 of vacuum manifold 24. Cooling plate 40 includes one or more cooling regions 42 and one or more vacuum regions 52, as shown in FIG. 3. Cooling regions 42 comprise indentation 43. For example, indentation 43 can extend laterally across cooling plate 40. Separation region 44 separates cooling region 42 from vacuum regions 52. Separation region 44 allows cooling region 42 and vacuum region 52 to operate independently. Preferably, cooling plate 40 is formed of a material having a low coefficient of friction for reducing friction between support belt 16 and vacuum manifold 24. For example, cooling plate 40 can be formed of a fluorine containing polymeric material such as polytetraflurine ethylene, known as Teflon® or rigid plastic or metal material. Teflon® is a registered trademark of DuPont.

Indentation 43 can have a height $H_1$ sufficient for retaining cooling fluid within indentation 43. For example, height $H_1$ can be in the range of about 0.10 inches to about 1.0 inches. A plurality of apertures 45 are formed in bottom surface 46 of indentation 43. Apertures 45 are spaced along the length of indentation 43 and extending a portion or substantially along the length of indention 43. Channel 47 is formed within cooling plate 40 below indentation 43. Channel 47 intersects apertures 45. Channel 47 is in fluid flow communication with apertures 45.

Figure 4:
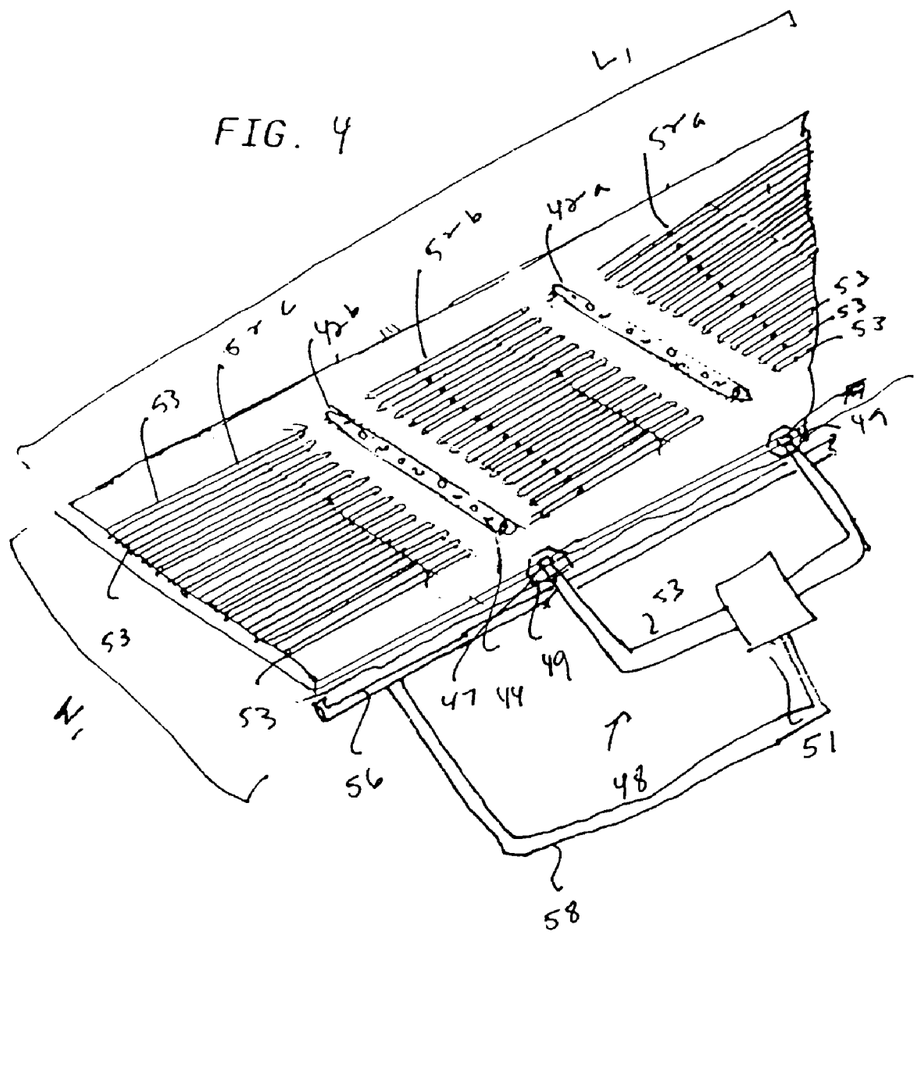
FIG. 4 is a schematic diagram of the cooling plate coupled to a cooling fluid source.

Cooling fluid source 48 provides cooling fluid 44 to cooling region 42, as shown in FIG. 4. Cooling fluid 44 can be water or any other suitable cooling fluid such as alcohol, glycerol, air or other gaseous medium. Cooling fluid source 48 is in fluid flow communication with channel 47. Cooling fluid source 48 can comprise valves 49 and pump means 51 interconnected by fluid flow lines 53 for controlling flow of cooling fluid 44 into channel 47. Cooling fluid 44 flows from cooling fluid source 48 through channel 47 and apertures 45 and is received in indentation 43.

Vacuum region 52 comprises a plurality of grooves 53 formed in cooling plate 40. Referring to FIGS. 1-4, vacuum means 23 forms a vacuum along grooves 53 of vacuum regions 52. Vacuum regions 52 can form sheet of material 12 against flexible patterned belt 14 in successive or separate steps. Grooves 53 are in fluid flow communication with perforations 21 of support belt 16. One or more apertures 54 are formed within grooves 53. One or more cooling fluid collectors 56 are positioned below respective one or more vacuum regions 52 for receiving cooling fluid 44 through apertures 54, as shown in FIG. 4. Cooling fluid collector 56 can extend along the length $L_1$ and width $W_1$ of cooling plate 40. Fluid flow 58 can return cooling fluid 44 received in one or more cooling fluid collectors 56 to cooling fluid source 48.

During operation, support belt 16 and flexible patterned belt 14 are driven by driving means 23 to rotate over cooling plate 40, as shown in FIG. 1. Sheet of material 12 extruded from extruder 11 can have a typical temperature in the range of about 250° F. to about 400° F., for example, about 380° F. to about 400° F. Vacuum regions $52a,52c$ draws sheet of flexible material 12 into flexible patterned belt 14 for shaping sheet of material 12. As hot extruded material is drawn into flexible patterned belt 14, flexible patterned belt 14 has an elevated temperature of about 200° F. to about 400° F. which facilitates drawing heat extruded material into fine detail of the pattern formed in flexible patterned belt 14.

Figure 5:
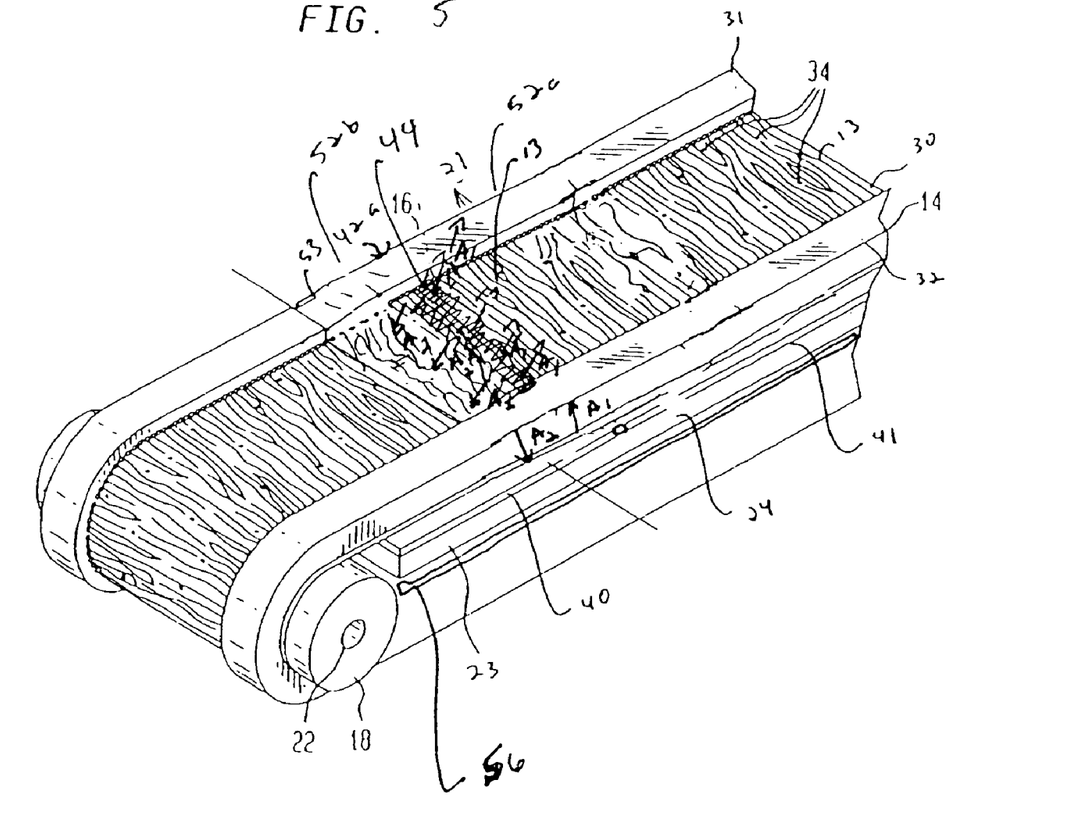
FIG. 5 is a schematic diagram showing flow of cooling fluid in one cooling region in the apparatus of the present invention before extruded material is received on a flexible patterned belt.

FIG. 5 illustrates an embodiment including one cooling region $42a$ between vacuum regions $52a$ and $52b$ before sheet of flexible material 12 is received on flexible patterned belt 14. During operation, cooling fluid source 48 provides cooling fluid 44 through channel 47 and apertures 45 of cooling plate 40 into indentation 43. As a result of negative pressure in cooling region 42, cooling fluid 44 is drawn upwardly in the direction of arrow $A_1$ from indentation 43 through apertures 34 of flexible patterned belt 14 positioned above cooling region $42a$. Upon exiting apertures 34 of flexible patterned belt 14, cooling fluid 44 forms a thin layer, for example, in the range of about 0.001 to about 0.50 inches, on top surface 13 of flexible patterned belt 14.

Figure 6:
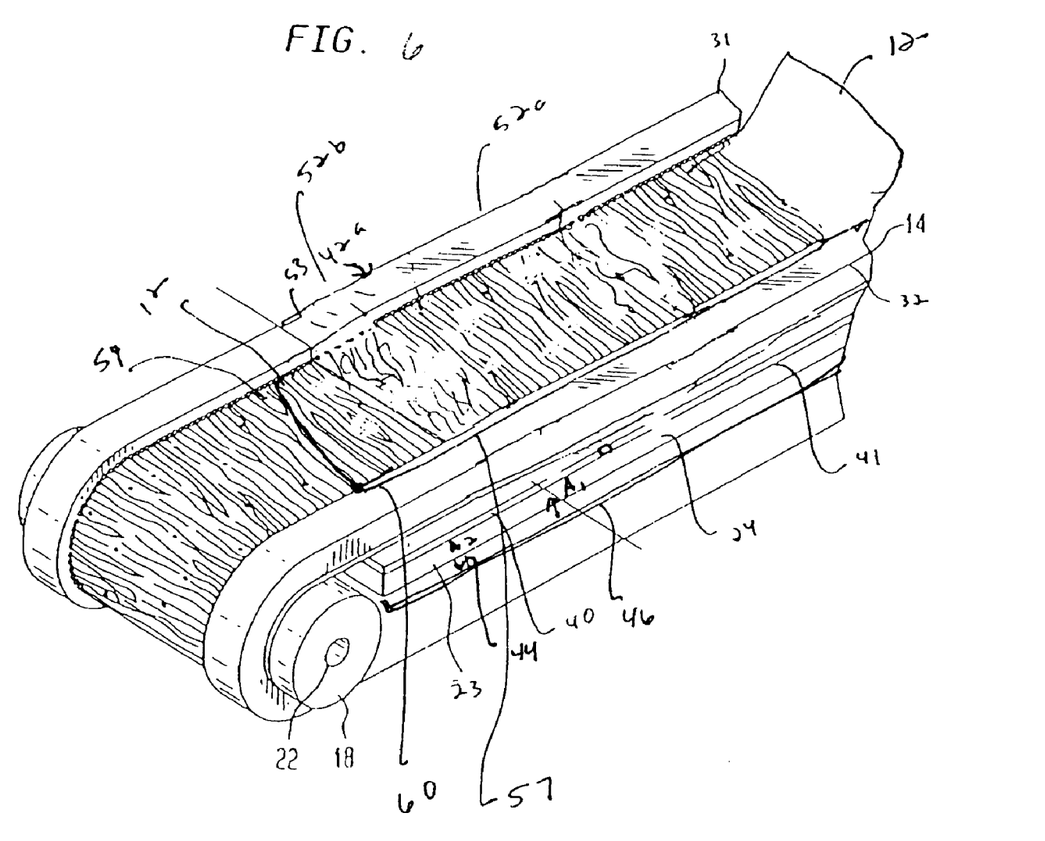
FIG. 6 is a schematic diagram of operation of the apparatus for cooling during continuous vacuuming forming after extruded material is received on the flexible patterned belt.

Sheet of material 12 is received on flexible patterned belt 14, as shown in FIG. 6. Sheet of material 12 is molded in vacuum region $52a$ and, cooling region $42a$ cools sheet of material 12 to set the shaped sheet of material.

Cooling fluid 44 contacts bottom surface 57 of sheet of material 12 for cooling bottom surface 57 of sheet of material 12 and setting shaped article 60 in cooling region 42a. For example, cooling fluid 44 can cool sheet of material 12 to the glass transition temperature of about 350° F. for a material having an extrusion temperature of about 380° F. to about 400° F. or below the heat deflection temperature of 160° F. to 170° F. typical for such compositions. Cooling region 42a also cools flexible patterned belt 14. The temperature of cooling fluid 44 can be selected for determining the amount of cooling of bottom surface 57 of sheet of material 12 and flexible patterned belt 14. For example, cooling fluid 44 can have a typical temperature within the range of about 34° F. to about 75° F. Cooling fluid 44 can have a temperature in the range of about 34° F. to about 50° F., preferably, about 40° F. to about 45° F. to provide sufficient cooling to chill bottom surface 57 of sheet of material 12 in cooling region 42a and cool flexible patterned belt 14. As flexible patterned belt 14 moves away from cooling region 42a into vacuum region 52b, cooling fluid 44 is pulled by vacuum in the direction of arrow $A_2$ through apertures 54 of flexible patterned belt 14, perforations 42 in support belt 16 and apertures 54 within grooves 53 of vacuum region 52, as shown in FIG. 5. Cooling fluid 44 flowing through apertures 54 is received in cooling fluid collector 56.

Referring to FIG. 1, one or more cooling devices 61 can be used for cooling upper surface 62 of sheet of material 12. Cooling devices 61 can be aligned with cooling regions 42. Accordingly, upper surface 62 of shaped article 60 and bottom surface 57 of shaped article 60 can be cooled simultaneously during and/or after the shaping process. Cooling regions 42 can be arranged to provide selected cooling of various regions of shaped article 60 and flexible patterned belt 14. In one embodiment, cooling region 42 does not extend beneath edges section 31 and 32 of flexible patterned belt 14. Accordingly, edges of sheet of material 12 remain hot and are not cooled by cooling region 42.

Figure 7:
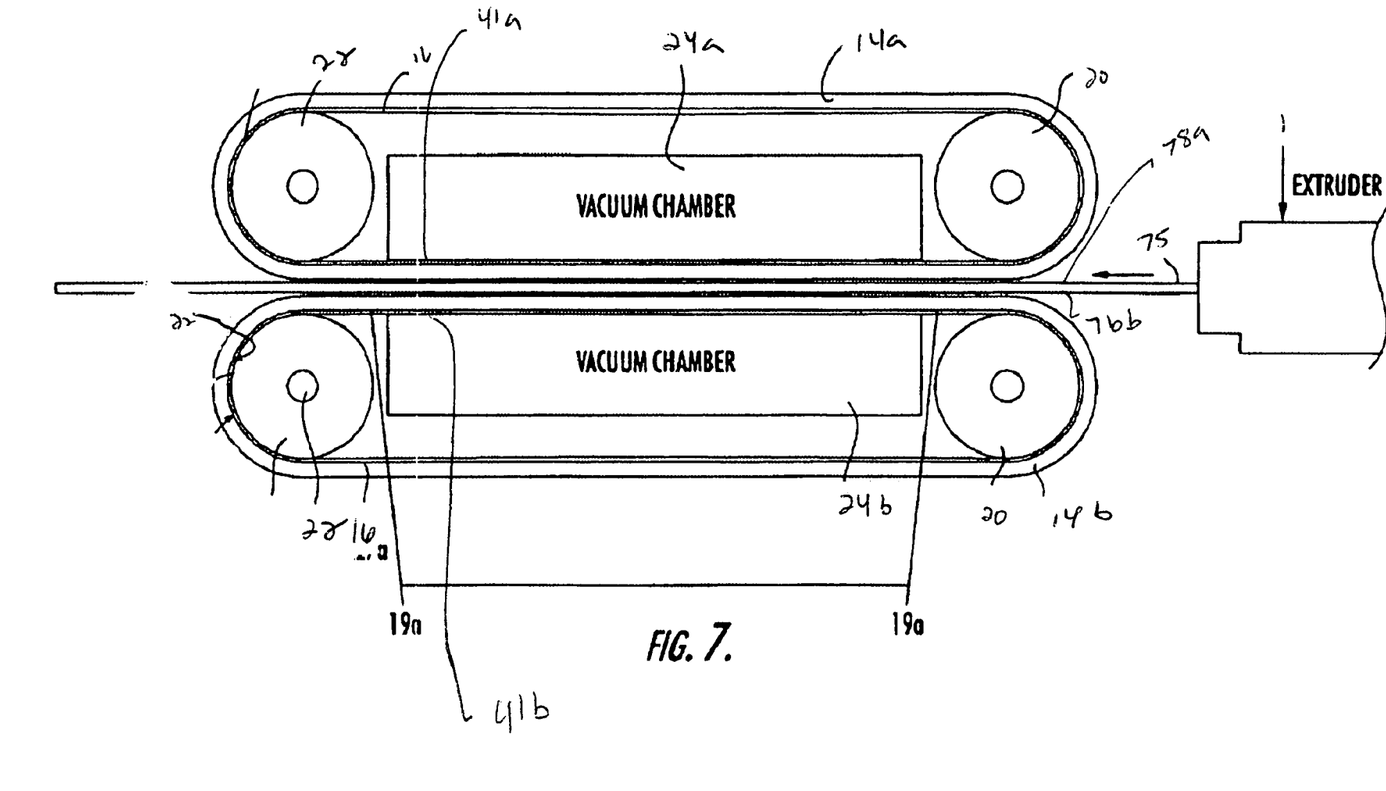
FIG. 7 is a side schematic diagram of the upper and lower belts each including vacuum means.
Figure 8:
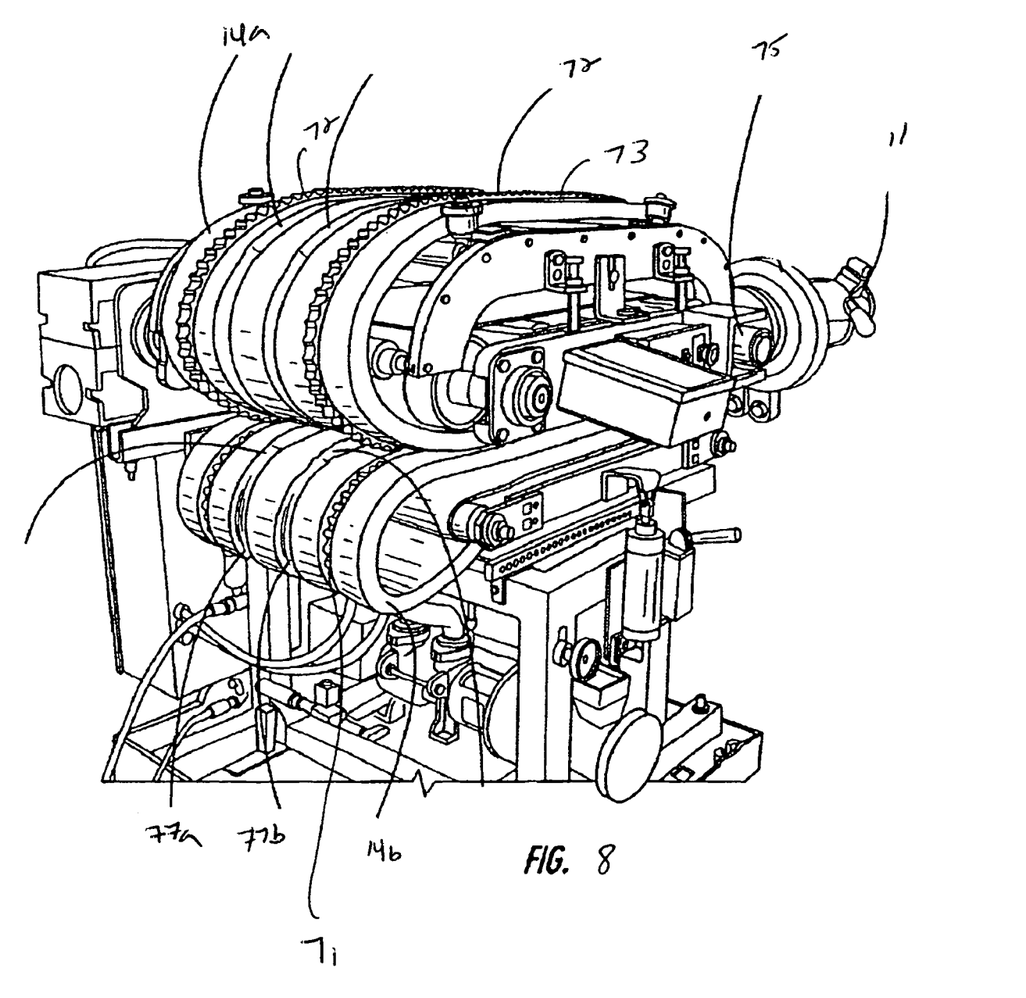
FIG. 8 is a side perspective view of a system for continuous vacuum forming between a pair of rotating belts in accordance with the teaching of the present invention.

In an alternate embodiment, continuous vacuum forming is performed between a pair of rotating flexible patterned belts 14a, 14b as shown in FIG. 7. Flexible patterned belt 14b includes a plurality of indentations 71 for receiving corresponding teeth 72 extending from outer surface 73 of flexible patterned belt 14a, as shown in FIG. 8. Support belt 16 is positioned beneath flexible patterned belts 14a, 14b. Flexible patterned belts 14a, 14b and respective support belts 16 are rotated by rollers 18 and 20. Support belt 16 is preferably formed of a flat perforated metal material. Rotation of upper belt 14a rotates lower belt 14b by continuous pulling of teeth 72. Molds 77a and 74b can be formed in flexible patterned belt 14a and flexible patterned belt 14b. Extruded material 75 is received in molds 74a and 74b to form a shape as described in U.S. Pat. No. 6,641,384, hereby incorporated by reference into this application.

Figure 9:
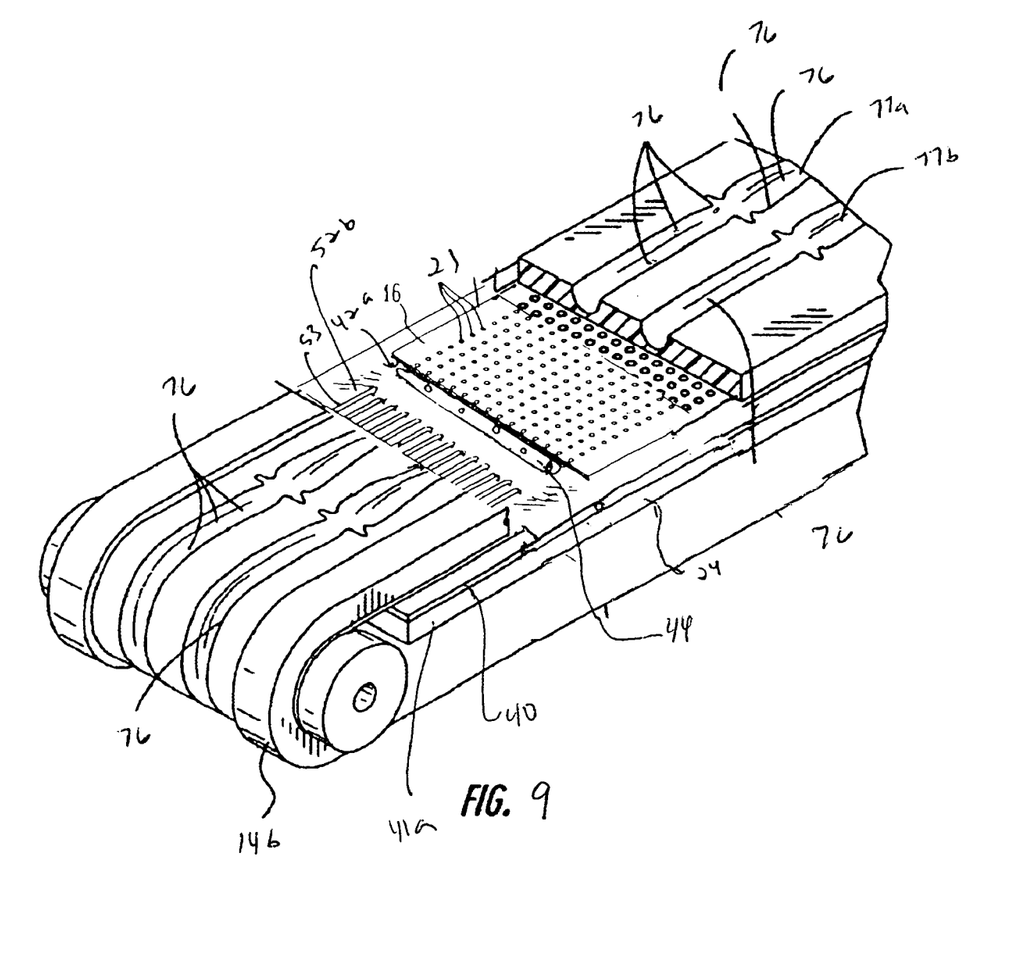
FIG. 9 is a top perspective view of the lower belt and support belt of the present invention.

A plurality of apertures 76 can be formed in flexible patterned belt 14a and flexible patterned belt 14b, as shown in FIG. 9. Apertures 76 are preferably placed in inconspicuous locations in mold 77a and mold 77b such that raised surface areas are not observable on the formed plasticized product. Cooling plate 40 is formed or attached to top surface 41a or 41b or respective vacuum manifold 24a and 24b for pushing through or drawing cooling fluid 44 as described above for providing cooling to surface 78a of extruded material 75 adjacent mold 77a and surface 78b of extruded material 75 received adjacent mold 77b, as shown in FIG. 7.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A method for continuous vacuum forming a material comprising the steps of:
    extruding an extruded sheet having an elevated temperature in the range of about 250° F. to about 450° F.;
    dispensing said extruded sheet on a rotating flexible patterned belt, said flexible patterned belt having apertures spaced along the length and width thereof;
    applying vacuum pressure in one or more vacuum regions positioned adjacent said flexible patterned belt for drawing said extruded sheet into forming contact with said flexible patterned belt; and
    applying cooling fluid in one or more cooling regions positioned adjacent said vacuum regions, said cooling fluid being drawn through said apertures of said flexible patterned belt to contact a bottom surface of said extruded sheet for cooling said extruded sheet below said elevated temperature during forming said extruded sheet,
    wherein the vacuum region removes the cooling fluid from the flexible patterned belt at said one or more cooling regions.

2. The method of claim 1 wherein said extruded sheet is cooled below a heat deflection temperature of said extruded sheet.

3. The method of claim 1 wherein said cooling fluid is water.

4. The method of claim 1 wherein said one or more vacuum regions comprise vacuum means for supplying a vacuum to a vacuum manifold and said one or more cooling regions and said one or more vacuum regions are formed in a cooling plate coupled or integral with a top surface of said vacuum manifold.

5. The method of claim 4 wherein said one or more cooling regions comprise an indentation in said cooling plate for receiving said cooling fluid wherein upon application of said vacuum means said cooling fluid flows from said indentation through said apertures of said flexible patterned belt.

6. The method of claim 5 further comprising a support belt said support belt being flat and having perforations spaced along the length and width thereof, said flexible patterned belt being fitted over said support belt and said support belt being rotated with said flexible patterned belt wherein upon application of said vacuum means said cooling fluid flows from said indentation through said perforation and through said apertures of said flexible patterned belt.

7. The method of claim 5 wherein a plurality of apertures are formed in said indentation and a channel is positioned within said cooling plate below said indentation, said channel being in fluid flow communication with said apertures of said indentation.

8. The method of claim 4 wherein said vacuum region comprises grooves formed in said cooling plate wherein said vacuum means forms a vacuum in said grooves, said grooves being in fluid communication with said perforations of said support belt.

9. The method of claim 8 wherein a plurality of apertures are formed in said grooves, said apertures receiving said cooling fluid upon application of said vacuum means.

10. The method of claim 1 further comprising the step of:
    collecting said cooling fluid drawn by said vacuum into a cooling fluid collector positioned below said one or more vacuum regions;

providing cooling at a region positioned respectively above said one or more cooling regions to cool an upper surface of said extruded sheet.

11. The method of claim 1 further comprising the step of:
providing cooling at a region positioned respectively above said one or more cooling regions to cool an upper surface of said extruded sheet.

12. A method for continuous vacuum forming a material comprising the steps of:

extruding an extruded sheet having an elevated temperature in the range of about 250° F. to about 450° F.;

dispensing said extruded material on a first flexible patterned belt having at least one mold therein, said first flexible patterned belt being fitted over a first support belt rotating on a first pair of rollers said first support belt being flat and having perforations spaced along the length and width thereof, said first flexible patterned belt having apertures spaced along the length and width thereof;

a second flexible patterned belt having at least one mold therein, said second flexible patterned belt being fitted over a second support belt rotating on a second pair of rollers, said second support belt being flat and having perforations spaced along the length and width thereof, said second flexible patterned belt having apertures spaced along the length and width thereof;

each of said at least one mold of said first flexible patterned belt and each of said at least one mold of said second flexible patterned belt forming at least one channel, each of said at least one mold of said first flexible patterned belt and each of said at least one mold of said second flexible patterned belt are adjacent one another;

applying vacuum pressure in one or more vacuum regions positioned adjacent said first support belt and said second support belt for drawing said extruded sheet into forming contact with said flexible patterned belt; and applying cooling fluid in one or more cooling regions positioned adjacent said vacuum regions, said cooling fluid being drawn through said apertures of said first flexible patterned belt and said second flexible patterned belt to contact a surface of said extruded sheet for cooling said extruded sheet below said elevated temperature during forming said extruded sheet wherein said one or more vacuum regions removes the cooling fluid from the flexible patterned belt at said one or more cooling regions.

13. The method of claim 12 wherein said extruded sheet is cooled below a heat deflection temperature of said extruded sheet.

14. The method of claim 12 wherein said cooling fluid is water.

15. The method of claim 12 wherein said one or more vacuum regions comprise vacuum means for supplying a vacuum to a vacuum manifold and said one or more cooling regions and said one or more vacuum regions are formed in a cooling plate coupled or integral with a top surface of said vacuum manifold.

16. The method of claim 15 wherein said one or more cooling regions comprise an indentation in said cooling plate for receiving said cooling fluid wherein upon application of said vacuum means said cooling fluid flows from said indentation through said apertures of said first flexible patterned belt and said second flexible patterned belt.

17. The method of claim 16 wherein a plurality of apertures are formed in said indentation and a channel is positioned within said cooling plate below said indentation, said channel being in fluid flow communication with said apertures of said indentation.

18. The method of claim 12 wherein said vacuum region comprises grooves formed in said cooling plate wherein said vacuum means forms a vacuum in said grooves, said grooves being in fluid communication with said perforations of said first support belt and said second support belt.

* * * * *